United States Patent Office 3,376,203
Patented Apr. 2, 1968

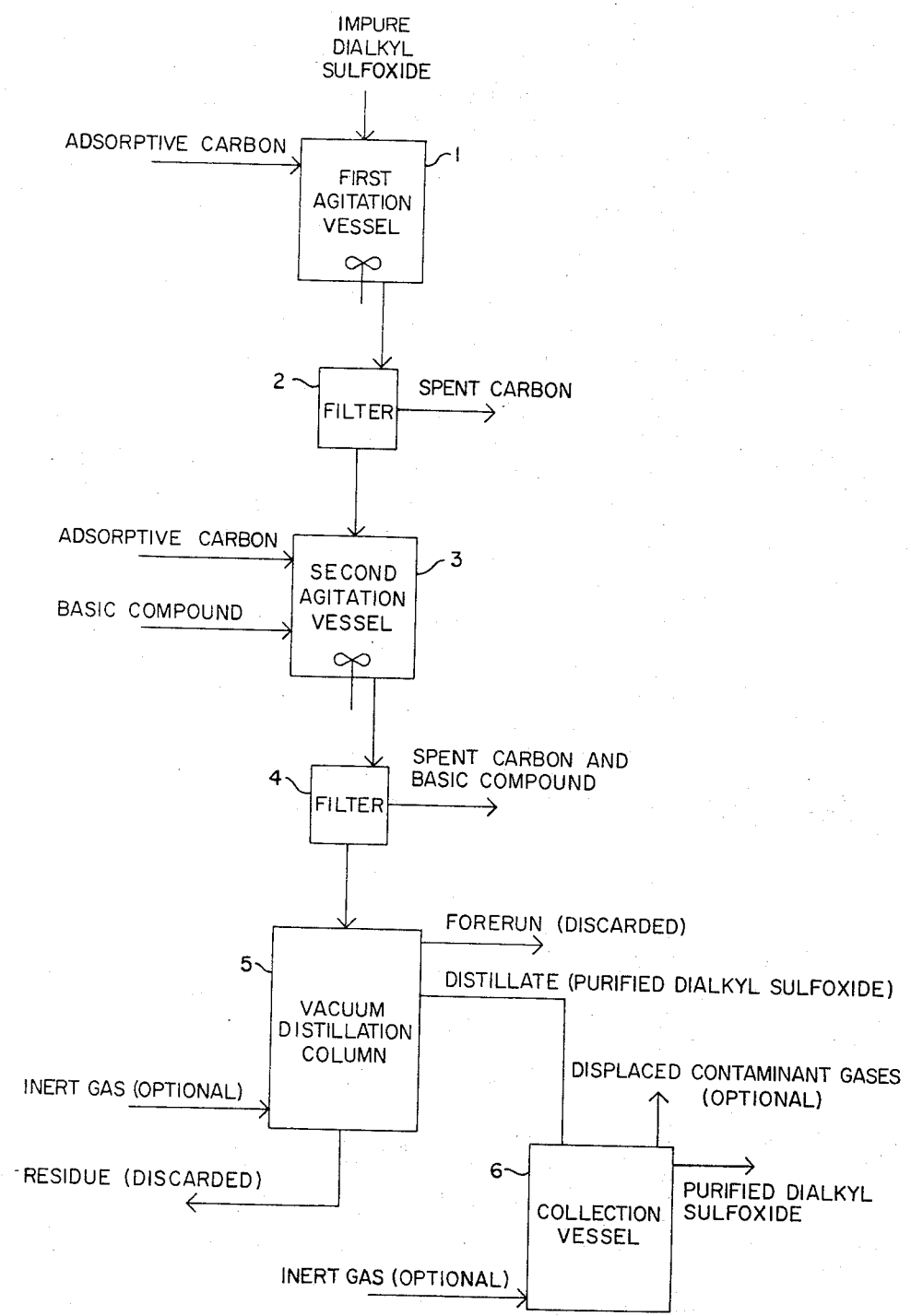

3,376,203
PURIFICATION OF DIALKYL SULFOXIDES BY TREATMENT WITH ADSORPTIVE CARBON
Homer Baird Lackey, Washougal, Wash., assignor to Crown Zellerbach Corporation, San Francisco, Calif., a corporation of Nevada
Continuation-in-part of application Ser. No. 384,548, July 22, 1964. This application July 28, 1965, Ser. No. 475,579
13 Claims. (Cl. 203—4)

ABSTRACT OF THE DISCLOSURE

A method for removing impurities from dialkyl sulfoxides having up to 6 carbon atoms, particularly those impurities manifesting like absorbance in the 270–300 mu range, by contacting the dialkyl sulfoxide with adsorptive carbon followed by fractional distillation at reduced pressure and collection of the purified sulfoxide as distillate. During or following distillation, the sulfoxide may be contacted with an inert gas to displace undesirable contaminant gases absorbed therein. The dialkyl sulfoxide may be contacted with a basic compound during or following the last carbon contact and before and/or during distillation to minimize degradation during distillation by extracted acids.

---

This application is a continuation-in-part of my copending application Ser. No. 384,548, filed July 22, 1964, now abandoned.

This invention relates to the treatment of dialkyl sulfoxides.

Dialkyl sulfoxides have a growing number of laboratory and industrial applications including use as a solvent, as a reaction medium and as a reagent. Also, recently it has been discovered that dialkyl sulfoxides have a number of potentially valuable medicinal and cosmetic uses.

Many of these uses, particularly analytical, pharmacological and cosmetological, require dialkyl sulfoxides of extremely high purity, much higher than that of dialkyl sulfoxides currently available in industrial grades.

While this invention is applicable to treatment of dialkyl sulfoxides up to and including dipropyl sulfoxide (i.e. dimethyl methyl ethyl, diethyl, ethyl isopropyl, ethyl n-propyl, dinormal propyl, diisopropyl and n-propyl isopropyl sulfoxides), the invention will be illustrated primarily with reference to dimethyl sulfoxide.

Dimethyl sulfoxide in pure form is a water clear, water miscible, hygroscopic, neutral, organic liquid melting at about 18.5° C. and boiling at 189° C.

Industrial grade dimethyl sulfoxide, such as that available from Crown Zellerbach Corporation of San Francisco, Calif., is produced as a by-product of the Kraft pulping process in the manufacture of paper. Specifically, it is derived from the chemically digested lignin compounds found in the spent liquor ("black liquor") as described, for example, in U.S. Patent Nos. 2,581,050, 2,702,824 and 2,935,533. Dimethyl sulfoxide is also produced as a by-product in petroleum refining. Produced in either manner dimethyl sulfoxide, although recovered by distillation, retains impurities which carry over from the reacting materials. This is due not only to entrainment, but also to (1) impurities having boiling points close to that of dimethyl sulfoxide and (2) gases which absorb readily in dimethyl sulfoxide (see U.S. Patent No. 2,539,871 with regard to dimethyl sulfoxide's affinity for various gases).

It is the object of this invention to provide a method of treating dialkyl sulfoxides, and particularly, dimethyl sulfoxide, to rid them of such impurities so that they are made suitable for analytical, medicinal, pharmacological and other uses where a high degree of purity is important. It is also an object of this invention to provide a method of purifying dialkyl sulfoxides so that the purified dialkyl sulfoxide is substantially pyrogen-free and acceptable for medical use. These and other objects of the invention will become apparent from the description of the invention which follows.

A great number of processes have been suggested in the past for purifying dialkyl sulfoxides, including multiple recrystallization and/or fractional distillation, contact with such diverse substances as calcium hydride, calcium oxide, barium oxide, sodium hydroxide, aluminum, alumina, calcium hydroxide, potassium hydroxide or triphenylmethane under various conditions, azeotropic distillation with benzene, decomposition of the salt of dimethyl sulfoxide and nitric acid with calcium carbonate and combinations of these processes. Nevertheless, these processes all have the common failings that they do not produce a sufficiently pure product and/or they are laborious, time-consuming, expensive and wasteful of the dialkyl sulfoxide. The number and diversity of purification procedures is a measure of the lack in the art of a satisfactory method.

In contrast, I now provide by the present invention a method by which dialkyl sulfoxides can be purified to a degree heretofore obtainable only through laborious, costly procedures, which is, at the same time, efficient, rapid and economical. Broadly, this method comprises contacting dialkyl sulfoxide to be purified with adsorbent carbonaceous material. It also contemplates removing undesirable gases from dialkyl sulfoxide with an inert gas. For example, with dimethyl sulfoxide I have found quite unexpectedly that adsorbent carbon selectively adsorbs impurities which are difficult to remove even by three fractional distillations without great loss of dimethyl sulfoxide. I have also discovered that certain undesirable gases are absorbed in impure dialkyl sulfoxide in considerable amounts either in solution or as complex molecular addition compounds. They may be displaced by an inert gas by intimately contacting the dialkyl sulfoxide with the inert gas during and/or following distillation. An inert gas may be chosen which is not an undesirable contaminant and which is not absorbed by the dialkyl sulfoxide in too great an amount. I have found that most inert gases will displace substantially all of the undesired gases.

As used herein the term "inert gas" is used to include not only gases which are inert in the strict chemical sense but gases such as carbon dioxide, ammonia, nitrogen and many others, which do not interfere with the intended use of the dialkyl sulfoxide, that is, which are "inert" to the intended use.

Purity of dialkyl sulfoxide can be measured by a variety of methods, some determining total impurities and others detecting only selected important contaminants. Total contaminating molecules can be measured by freezing point determination since all impurities lower the freezing point of the dialkyl sulfoxide (generally accepted by the literature for dimethyl sulfoxide as 18.0° C. to 18.45° C.).

Some important impurities are colored and they thus may be determined by measuring light transmission of dialkyl sulfoxide as compared with water since most pure dialkyl sulfoxides are clear and colorless. In the comparisons referred to herein 350 mu light is used. At this wave length dimethyl sulfoxide by the present process may be purified until it is more transparent than distilled water.

Some important impurities in dialkyl sulfoxides are normally colorless but they react with strong alkalies such as KOH to form colored compounds. For measurements herein, 5 pellets of analytical grade KOH and 0.2 ml. water are added to 25 cc. of the dialkyl sulfoxide. The mixture is heated for 30 minutes at the temperature of boiling water. The light transmission at 350 mu of the cooled supernatant liquid is compared with that of distilled water. The measurements so made are termed "KOH color."

Pure dimethyl sulfoxide is essential neutral and some impurities impart acidity or alkalinity. In the manner of this invention, dimethyl sulfoxide may be purified until it closely approaches neutrality, as measured by titration with acid or base.

Of prime importance in purity considerations is the test for light absorbance of dialkyl sulfoxides in the ultraviolet region, particularly in the 270–300 mu range. Dimethyl sulfoxide, for example, is used as an analytical extractant of various aromatic compounds (which are then measured by ultraviolet absorbance in dimethyl sulfoxide solution). The lower the amount of contaminants absorbing in this range, the more sensitive dimethyl sulfoxide is as an analytical tool for this purpose. Since many fever-inducing materials (pyrogens) absorb light in the 270–300 mu region, low absorbency in this region is quite important in indicating freedom from pyrogens in dimethyl sulfoxide for medical use.

Since dialkyl sulfoxides purified in the manner of this invention has a very low light absorbance in this range, it is an indication of the freedom of contamination and high-degree of purity obtainable thereby.

For removal of contaminants from dialkyl sulfoxides I prefer to use acid-washed, heat and steam-activated wood charcoal. However, other adsorptive carbons may be used including those obtainable from bone chars, soda lignin, lignite, and many others. If a multi-stage treatment is desired, cheaper, less-effective carbons may be used as a preliminary treatment followed by a second stage utilizing a carbon best adapted to remove the remaining traces of impurities.

The amount of adsorptive carbon is dependent upon the amount and types of impurities, type(s) of carbon and the technique of contact. While 10% carbon by weight or even higher concentration (based on dimethyl sulfoxide) may be used, economy makes lower concentrations more desirable. When one contact with carbon is designed to remove as much impurity as possible, about 5% carbon may be used. Greater efficiency is obtained by more than one contact. For example, dimethyl sulfoxide from a two-stage process consisting of contact with 2% carbon, filtration, 1% carbon and filtration is purer than that obtained by a single 5% carbon treatment. A continuous countercurrent process would be desirable. Preferably, the dialkyl sulfoxide is agitated with the adsorptive carbon in a finely divided state in order to obtain intimate contact. This may be carried out in any suitable mixing apparatus such as a mixing tank.

Most efficient contact times depend upon the amount and types of impurities, type and amounts of carbon and temperature. Although not critical, 20 to 40 minutes' contact time for each contact usually gives optimum efficiency since shorter times often cause incomplete removal. At least 15 minutes contact is preferred. Contact for greatly extended periods appears to give no measurable advantage.

Temperature of contact is not critical. Substantial purity increases have been obtained for dimethyl sulfoxide at temperatures as high as 110° C., although best results are most often obtainable in the 20° to 40° range. With some carbons, faster results are obtained at elevated temperatures. But, others, such as the preferred acid-washed, heat and steam-activated charcoal function more efficiently at room temperature.

After each contact, the carbon (usually in finely divided form) may be removed by filtration. Many carbons contain acids or other activating or purifying reagents, as well as water, which are extracted by the dialkyl sulfoxide and remain with it. Thus, after separation of the dialkyl sulfoxide from the carbon it is desirable to remove the carbon-borne impurities. These impurities, except for the acids, are desirably and most expeditiously removed by efficient fractional distillation.

I have found that acid impurities, however, cause an appreciable breakdown of dialkyl sulfoxides during distillation even at lower temperatures, which breakdown consequently lowers the yield of purified dialkyl sulfoxide and adds to the impurities therein (as breakdown products). This is particularly true as the concentration of the acids builds up in the distilland near the end of the distillation. Consequently, a greater portion of the distilland must be discarded and the distillation terminated at an earlier stage than would be desirable.

Most highly purified and reactive carbons (and the most desirable carbons for the present process) are acid-treated usually with mineral acids such as hydrochloric acid and sulfuric acid to remove mineral impurities and other contaminating materials and, in some instances, to further activate the carbon. Because of the risk of deactivating the carbon, the acid cannot be completely removed from the minute pores of the carbon after acid treatment. However, these acids are extracted by the dialkyl sulfoxide when the dialkyl sulfoxide is treated therewith prior to distillation. Since the acid-treated carbons are highly desirable in the present process, it obviously would be advantageous to prevent the destructive effect of the extracted acids during distillation.

I have found that this may be accomplished, in accordance with this invention, by the addition of a basic compound such as an alkali or alkaline earth metal oxide, hydroxide, or carbonate to the dialkyl sulfoxide during or after the last carbon contact therewith. For example, calcium, barium and strontium oxides, as well as the hydroxides and carbonates of these metals and of sodium and potassium may be employed for this purpose. Magnesium oxide is preferred because of its availability, very low solubility and the low solubility of its salts. Also it has been found that magnesium oxide and its salts with the acids will stick to the carbon particles and therefore facilitate removal as well as prevent uncontrollable factors, such as bumping during distillation.

I prefer to add the basic compound at the same time the last carbon is added to the dialkyl sulfoxide. In this fashion the acids (which are believed to react with the basic compound to form insoluble salts) and any excess basic compound may be removed by filtration along with the carbon. However, the basic compound may be added later as a separate treatment. While it is preferred to remove the reaction products of the basic compound and the acids prior to distillation, it is feasible to simply leave these impurities in the dialkyl sulfoxide even during distillation and discard them with the residue, in the case of the alkaline earth compounds.

The specific amount of basic compound added is not critical, but at least a stoichiometric amount should be added to neutralize the acid present. Preferably, considerable excess is employed to assure complete reaction and it is advantageous to utilize material which is in finely divided form. It is preferred to use an amount which is about one-half of the amount of carbon added in the last carbon treatment step, and this may amount to 0.25 percent to 2.5 percent of the dialkyl sulfoxide.

To facilitate filtration of both the activated carbon and the basic compounds, a conventional filtering aid such as Celite 545, a diatomaceous earth composition supplied by Johns-Manville Corporation, may be added prior to filtration in a minor amount such as 1 percent based on the dimethyl sulfoxide.

By utilizing treatment with a basic compound, the yield of purified dimethyl sulfoxide may be increased in the order of 3 percent to 10 percent over yields where the dimethyl sulfoxide is distilled without treatment with a basic compound to prevent the destructive effect of the extracted acids.

Water is removed in the forerun of the distillation. In a column having 4 to 6 theoretical plates, most of the water can be taken off with the first 3% to 8% of the distillate, depending upon the mode of operation. The amount of water present in the distillate can be quickly checked by measuring the freezing point. For dimethyl sulfoxide, when the freezing point of distillate has reached 17.5° to 18° C., most of the water has been removed.

Any remaining acids or salts, unfiltered carbon, and other nonvolatile materials remain in the residue. The presence of undesirable materials in the distillate as the distilland diminishes can be deteced by an increase in optical absorbance of the distillate at 270 to 300 mu and the rectification halted accordingly. With a 4 to 6 theoretical plate column, leaving 2% to 5% of the total as residue provides adequate purity.

Although I prefer using a 4 to 6 theoretical plate ring-packed glass fractionation column, other types of rectifying equipment, including rectifying columns of the bubble cap plate, sieve plate and packed column types, may be used; different amounts of forerun and residue may be discarded, depending upon the purity required.

Distillation is desirably carried out under reduced pressure, in order to keep the temperature as low as possible, and as rapidly as possible, consistent with good practice, to minimize exposure to elevated temperature. This is because at higher temperatures some deterioration of dialkyl sulfoxides may occur. For example, with the same dimethyl sulfoxide sample, measurably superior quality is obtained at 16 mm. Hg pressure and 79° C. head temperature than is obtained at 80 mm. Hg and 119° C. head temperature. Preferably pressure is maintained below 25 mm. Hg so that the distilling temperature is 90° C. or less.

Dialkyl sulfoxides purified according to the foregoing procedure generally still retains, in dissolved and/or molecular complex form, gases which are undesired impurities. Since these gases generally cause markedly increased (relatively high) light absorbency of dialkyl sulfoxide at 270 to 300 mu, the range in which pyrogens and undesirable aromatic compound impurities show up, they pose a particular problem. The most prevalent of these impurities is oxygen from the air but undesirable gases such as carbon monoxide, hydrogen sulfide and others also are encountered.

These undesirable gases are removed, in accordance with this invention, by contacting the dialkyl sulfoxide with an inert gas which has a low solubility in the dialkyl sulfoxide and one which imparts to the dialkyl sulfoxide only a low ultraviolet light absorbance in the critical 270 to 300 mu range when dissolved therein (whether in simple solution or in the form of complex molecular addition compounds with the dialkyl sulfoxide). I find that in this manner the undesirable gases can be displaced and the dialkyl sulfoxide rendered substantially free of such gases to provide an extremely pure dialkyl sulfoxide for analytical and medical purposes.

This treatment is applicable to dialkyl sulfoxide which has been purified by the various prior art methods alluded to but it is peculiarly suitable for dialkyl sulfoxide purified by the carbon contact-distillation process described above since contact with the desired gas is advantageously carried out during distillation.

Gases which may be used to displace the undesired gases may be selected with the end use of the dialkyl sulfoxide in mind but in every case it is desirable to employ a gas which causes only low light absorbency in the critical 270 to 300 mu range. Dialkyl sulfoxide for medical use desirably is contacted with a gas which is non-toxic and non-pyrogenic and which will not interfere with the intended medical use, for example nitrogen, carbon dioxide, helium or argon. Dialkyl sulfoxide for analytical use should be contacted with a gas which will not interfere with the particular analytical procedure for which it is to be used. Examples of gases which may be suitable include (in addition to those listed above for medical use) petroleum ether, 1-butene, hydrogen, ethylene, propylene, ammonia and natural gas.

Following is a table comparing the 275 mu light absorbance of dimethyl sulfoxide saturated with undesirable gases and with gases which may be selected to displace undesirable gases:

TABLE I

A. Undesirable gas: Light absorbance at 275 mu

| | |
|---|---|
| $SO_2$ | 1+ |
| $H_2S$ | 1+ |
| Acetylene | 1+ |
| CO | 1+ |
| $O_2$ | 0.59 |
| Air | 0.22 |

B. Control dimethyl sulfoxide (carbon-contacted and rectified __ 0.20

C. Replacement gas:

| | |
|---|---|
| Petroleum ether | 0.20 |
| 1-butene | 0.18 |
| Natural gas | 0.16 |
| Hydrogen | 0.125 |
| Nitrogen | 0.12 |
| Ethylene | 0.12 |
| Propylene | 0.12 |
| Carbon dioxide | 0.115 |
| Helium | 0.11 |
| Ammonia | 0.11 |

It is postulated that replacement of gases in most of the instances described is a reversible process which indicates that no irreversible chemical reaction (such as oxidation) takes place. For example, 275 mu light absorbance of the starting material may be changed from 0.20 to 0.22 by saturation with air, then changed to 0.12 by saturation with nitrogen and then brought back to 0.22 by saturation again with air.

Although any of the well-known methods of gas-liquid contact, such as packed columns, bubble tray absorption columns, spray towers or agitated vessels, may be employed in removal of undesirable gases, it is advantageous to carry out this operation coincidentally with the previously described distillation step following carbon contact.

Preferably a small stream of bubbles of the selected gas (or gases) is introduced directly into the boiling distilland in the distillation pot. In this manner the gas serves the dual purposes of removing undesirable gases from dialkyl sulfoxide and preventing bumping of the liquid. The rate at which gas is introduced may be adjusted for optimum removal of undesired gases. Optimum removal may conveniently be controlled by measuring 270–300 mu light absorption of the distillate during distillation and setting gas introduction at a rate where increase in rate does not appreciably decrease 270–300 mu absorption. Maintaining the smallest effective gas introduction rate is preferable since this allows a partial vacuum to be maintained more efficiently.

Removal of undesired gases during distillation is enhanced by the partial vacuum, which assists by immediately carrying such gases from the system and by the elevated temperature of distillation, which lowers the solubility of undesired gases and thus assists their removal.

Desirably, when the distillate is removed, the treating gas is used to relieve the partial vacuum and the purified dialkyl sulfoxide is thereafter maintained under an atmosphere of such gas. When removed to other containers, the air in the headspace of such containers may be flushed out with (and displaced by) the treating gas in order to maintain purity of the dialkyl sulfoxide for an indefinite time.

It is particularly advantageous to saturate the dialkyl sulfoxide from the rectification step by intimate contact with the inert gas at atmospheric pressure (as by bubbling a stream of the gas therethrough) after the partial vacuum is relieved. This is in order to satisfy the increased gas solubility of the distillate once the vacuum is removed. Contamination by reabsorption of undesired gases is thus urements indicate the improvement in purity obtained in each step of this procedure:

TABLE III

| Treatment | Light Absorbance (275 mμ) | Color (350 mμ), Percent | KOH Color, Percent | Water Content, Percent | Acidity [1] |
|---|---|---|---|---|---|
| 1. Before treatment | .52 | 88 | 61 | 0.027 | 0.0073 |
| 2. After 2% Darco S-51 carbon contact and then filtration | .37 | 92 | 79 | 0.317 | 0.1752 |
| 3. Darco G-60 contact and then filtration | .23 | 96.5 | 81 | 0.410 | 0.0737 |
| 4. After distillation | .21 | 100 | 77 | 0.039 | 0.0064 |

[1] Meq. acid/100 g.

minimized even when the dialkyl sulfoxide comes in contact with such gases during handling or use, because displacement of the absorbed gas by the undesired gas occurs much less readily than absorption of the undesired gas in partially unsaturated dialkyl sulfoxide.

Various aspects of the invention may be further described in general fashion with reference to the accompanying diagrammatic drawing, which is a flow sheet of an embodiment of the process of the invention representing Examples 2, 3, 4 and 8 which follow. Impure industrial grade dialkyl sulfoxide is fed into a first agitation vessel 1 into which adsorptive carbon is also introduce. After the dialkyl sulfoxide has been agitated with the carbon a sufficient length of time, such as 30 minutes, the mixture is removed and passed through filter 2 to remove the carbon. The filtered dialkyl sulfoxide is then introduced into a second agitation vessel 3 along with more adsorptive carbon and a basic compound such as magnesium oxide. The mixture is agitated for a period of time such as 30 minutes and then removed and passed through filter 4 to remove the carbon and basic compound. The dialkyl sulfoxide is then introduced into vacuum distillation column 5 to undergo vacuum distillation. A small forerun, or light fraction, is taken off (predominantly water) and discarded and the major portion of the dialkyl sulfoxide is distilled over into collection vessel 6. A minor impurity-containing portion is discarded as residue at the bottom of the distillation column. Optionally, a small quantity of inert gas, such as nitrogen, may be introduced continuously into the distilland during distillation. Also, optionally, inert gas may be introduced into the collection vessel to displace to the atmosphere dissolved contaminant gases in the purified dialkyl sulfoxide.

The following examples are illustrative:

*Example 1*

Industrial grade dimethyl sulfoxide which had been redistilled in the laboratory was agitated with acid-washed, heat and steam-activated wood charcoal sold under the trade name Darco G-60 at the concentration of 5% based on the dimethyl sulfoxide, for a period of 30 minutes at a temperature of around 25° C. The charcoal was then removed by filtration and the dimethyl sulfoxide fractionally distilled in a 5-6 theoretical plate column under a partial vacuum of about 20 mm. Hg. The portion after a 2% discarded forerun was recovered, leaving 5% of the total as residue. The following purity measurements indicate the improvement in purity by this treatment:

TABLE II

| Treatment | Light Absorbance (275 mμ) | KOH Color, Percent |
|---|---|---|
| 1. Before treatment | 0.32 | 82 |
| 2. After 5% Darco G-60 carbon contact and filtration | 0.13 | 87 |
| 3. After distillation of 2 | 0.10 | 97 |

*Example 2*

Industrial grade dimethyl sulfoxide was agitated with a 2% concentration of Darco S-51, a lignate carbon, for 30 minutes at 25° C., filtered, and then agitated with a 1% concentration of Darco G-60 for 30 minutes at 25° C. After removal of this carbon by filtration the product was distilled as in Example 1. The following purity meas-

*Example 3*

Dimethyl sulfoxide at 25° C., purified by the process described in Example 2, except that Darco G-60 was used in both stages, was saturated with air by bubbling air into it for 10 minutes in a beaker. Ultraviolet light absorbance was measured and the dimethyl sulfoxide then saturated with nitrogen in the same manner. The light absorbance was again measured. The following table indicates the purity improvement of the nitrogen-treated dimethyl sulfoxide over both the starting material from the carbon contact distillation treatment and the air-saturated dimethyl sulfoxide:

TABLE IV

| Treatment | Light Absorbance | |
|---|---|---|
| | 275 mμ | 300 mμ |
| 1. Purified by the procedure of Example 2 | 0.145 | 0.03 |
| 2. After saturation with air | 0.185 | 0.05 |
| 3. After saturation of 2 with nitrogen | 0.085 | 0 |

Dimethyl sulfoxide of approximately the same purity as that obtained in Example 2 was treated in the same manner with other selected gases for removal of undesirable gases. The results are shown at portion C of Table I, above.

*Example 4*

Industrial grade dimethyl sulfoxide was agitated with a 2% concentration of Darco G-60 carbon 30 minutes at 25° C. and filtered. This process was repeated on the same dimethyl sulfoxide. This yielded 92.7% (4.17 l.) of the starting material. The material was placed in a 5 liter distillation flask connected to a 5-6 theoretical plate column and distilled at about 20 mm. Hg. Nitrogen gas was introduced to the bottom of the distillation flask by means of a glass capillary which admitted a fine stream of bubbles. A 14.5% forerun and a 12.2% residue were discarded, leaving a product of 66% of the original starting material.

Quality comparison of the starting material and the purified product are indicated on the following table:

TABLE V

| | Starting Material | Purified Material |
|---|---|---|
| Color at 350 mμ | 73.0 | 100+ |
| KOH Color | 52.0 | 97.0 |
| Freezing Point, °C | 18.5 | 18.5 |
| Light Absorbance at 275 mμ | .56 | .08 |

After relief of the vacuum, the distillates was resaturated with nitrogen by bubbling a stream of nitrogen gas therethrough. The saturated dimethyl sulfoxide was then transferred to standard reagent bottles, the head space in the bottles flushed out with nitrogen. The bottles were then capped for storage and use.

In a like manner any of the following gases may be substituted for nitrogen, i.e., they may be bubbled into the distilland and introduced to relieve the partial vacuum to resaturate the distillate after relief of the vacuum, and to fill the head space over the distillate: petroleum ether, natural gas, 1-butene, hydrogen, ethylene, propylene, carbon dioxide, helium, argon and ammonia.

*Example 5*

This example contrasts a once redistilled industrial grade dimethyl sulfoxide purified in the manner of this invention with the same dimethyl sulfoxide purified by prior art techniques.

An industrial grade dimethyl sulfoxide, after it was redistilled once, was purified as described in Example 4.

The same grade, after it was redistilled once, was purified by three prior art techniques. One sample was purified by contacting it with 1% NaOH for a short time followed by a distillation at about 20 mm. Hg in which 5% was left as residue and 8% discarded as forerun.

Another sample was cooled to the freezing point and until approximately 75% of the total was crystallized. The sample was then filtered to separate the crystals. The filtrate (25%) was discarded as impurity.

Another sample was distilled again at about 20 mm. Hg saving the distillate after a forerun of 2% and leaving a residue of 5%. The distillate was redistilled in the same manner and the distillate thus collected again distilled in the same manner. In the second distillation 2% forerun and 5% residue were discarded and in the third 2% forerun and 5% residue were discarded.

The table below shows the purity measurements of the samples thus purified. The only sample having a purity even close to that obtained by the present invention was the result of a time-consuming process (3 consecutive distillations) in which 60% of the original sample was lost:

TABLE VI

| Treatment | Light Absorbance | | | Color | KOH Color |
|---|---|---|---|---|---|
| | 270 | 275 | 280 | | |
| 1. Once distilled industrial grade dimethyl sulfoxide | 0.44 | 0.32 | 0.27 | | 82 |
| 2. Carbon treatment followed by distillation with nitrogen contact | 0.23 | 0.12 | .08 | 100 | 95 |
| 3. Crystallization | | 0.45 | | 77 | |
| 4. Three successive fractionations | 0.29 | 0.175 | 0.13 | 100 | 97 |
| 5. Reaction with NaOH, distillation | 0.33 | 0.21 | 0.16 | | 92 |

*Example 6*

Methyl ethyl sulfoxide was made by oxidation of the corresponding sulfide. The reaction product, methyl ethyl sulfoxide, was dark yellow-brown and gas chromatographic examination of it showed:

| | Percent |
|---|---|
| Methyl ethyl sulfoxide | 58.0 |
| Methyl ethyl sulfone | 29.2 |
| Methyl ethyl sulfide | 11.0 |
| Unidentified | 1.8 |

The reaction product was stirred with 2% of its weight of Darco G-60 carbon for 45 minutes at 23° C. and then filtered to give a dark yellow-green solution. Three successive similar treatments each with 1% of the carbon resulted in a light-yellow solution. After filtration and standing overnight the filtrate was nearly colorless. Chromatography showed lesser amounts of impurities in the filtrate.

The filtrate was distilled at 35 mm. Hg and at a vapor temperature of 105° C. with a glass 20-plate column, while a stream of nitrogen passed through. The distillate fraction which contained substantially all of methyl ethyl sulfoxide had the following analysis:

| | Percent |
|---|---|
| Methyl ethyl sulfoxide | 98.5 |
| Methyl ethyl sulfone | 0.0 |
| Methyl ethyl sulfide plus water | 0.7 |
| Unidentified | 0.8 |

In accordance with the process of this invention the dialkyl sulfoxides may be treated by a batch or continuous process.

*Example 7*

A purification of dimethyl sulfoxide was carried out using minimum quantities of adsorbing carbon. The dimethyl sulfoxide was treated for 30 minutes by stirring with 1 percent of its weight of Darco G-60 carbon. The carbon was removed by filtration. Titration of a portion of the filtrate with standard base showed a substantial increase in acidity as compared to the untreated dimethyl sulfoxide. The filtrate was distilled in a glass column with a stream of nitrogen passing through during distillation.

A yield of 64 percent of acceptable quality dimethyl sulfoxide was obtained, based on the amount originally taken. The loss was greatest in two areas.

(1) Even after removal of most of the water, the first part of the distillate had such high ultraviolet absorbance that it could not be used.
(2) While a substantial amount of dimethyl sulfoxide remained in the distilling vessel, the distillate again began to have high absorbance and distillation was stopped.

*Example 8*

A purification as shown in Example 7 was carried out, using the same starting materials and procedures. A single change was made. After 15 minutes of carbon treatment, 0.5 percent magnesium oxide, based on the amount of dimethyl sulfoxide, was added. This was removed by filtration with the carbon after 15 minutes of treatment and the dimethyl sulfoxide distilled as in Example 7.

The yield or purified dimethyl sulfoxide, having the same level of purity as that obtained in Example 7, was 73 percent, with no high absorbance distillate in the early stages and substantially reduced amounts at the end of the distillation.

With regard to the introduction of the inert gas into the distilland during rectification, since gas flow into the rectification system makes it more difficult to maintain the lowest possible pressure therein (in order to minimize degradation of the dialyl sulfoxide due to increased temperature) it may be better to omit inert gas contact at this stage if the vacuum producing equipment and the rectification system is of limited capacity.

In carbon contacting the dialkyl sulfoxide, the dialkyl sulfoxide, optionally, may be removed from the carbon in the rectification step by rectifying the dialkyl sulfoxide-carbon mixture and withdrawing the carbon as part of the bottoms.

To assure saturation of the dialkyl sulfoxide with inert gas at atmospheric pressure by bubbling the inert gas through it, this operation may require as much as one-half to a full hour of such contact. Therefore, to effect more rapid saturation of the rectified dialkyl sulfoxide with the inert gas, it may be desirable to maintain the dialkyl sulfoxide in an atmosphere of the inert gas at a pressure above atmospheric, say, at 50 p.s.i.g., while bubbling the inert gas through it. While substantially complete saturation with the inert gas is desirable, it may be sufficient for some end uses to partially saturate the dialkyl sulfoxide but to absorb sufficient inert gas in it so as to remove the major portion of gas contaminants or to inhibit their reabsorption in the otherwise unsaturated dialkyl sulfoxide. These and other modifications will be apparent to those skilled in the art without departing from the scope and spirit of this invention.

What I claim is:

1. The process of treating a dialkyl sulfoxide containing up to 6 carbon atoms to remove impurities, particularly those causing relatively high light absorbance at 270–300 mu, which comprises contacting the dialkyl sulfoxide with adsorptive carbon and separating the dialkyl sulfoxide from said carbon.

2. The process of treating an at least once-distilled dialkyl sulfoxide containing up to 6 carbon atoms, to remove impurities, particularly those causing relatively high light absorbance at 270–300 mu, which comprises contacting the dialkyl sulfoxide with between 1% and 10% of its weight of an acid washed adsorptive carbon for at least 15 minutes and separating the dialkyl sulfoxide from said carbon.

3. The process of treating a dialkyl sulfoxide containing up to 6 carbon atoms to remove impurities, particularly those causing relatively high light absorbance at 270–300 mu, which comprises contacting the dialkyl sulfoxide with adsorptive carbon and rectifying the dialkyl sulfoxide and collecting, as purified dialkyl sulfoxide, the distillate having low 270–300 mu light absorbance.

4. The process of treating a dialkyl sulfoxide containing up to 6 carbon atoms to remove impurities, particularly those causing relatively high light absorbance at 270–300 mu, which comprises contacting the dialkyl sulfoxide with adsorptive carbon, rectifying the carbon treated dialkyl sulfoxide while maintaining the pressure below 80 mm. Hg and collecting the distillate having low 270–300 mu light absorbance, relieving the pressure over the distillate to atmospheric and saturating the distillate with an inert gas.

5. The process of treating dimethyl sulfoxide to remove impurities, particularly those causing relatively high light absorbance at 270–300 mu, which comprises contacting the dimethyl sulfoxide with adsorptive carbon, separating the dimethyl sulfoxide from said carbon, rectifying the dimethyl sulfoxide and collecting the distillate having low 270–300 mu light absorbance and then contacting the collected distillate with an inert gas.

6. The process of treating dimethyl sulfoxide to remove impurities, particularly those causing relatively high light absorbance at 270–300 mu, which comprises contacting dimethyl sulfoxide at least once with between 1% and 10% of its weight of adsorptive carbon for at least 15 minutes, separating the dimethyl sulfoxide from the carbon, rectifying the dimethyl sulfoxide while maintaining the pressure below 80 mm. Hg, contacting the dimethyl sulfoxide, during rectification, with an inert gas, separating and discarding a forerun of impure distillate, collecting the distillate having low 270–300 mu light absorbance as purified dimethyl sulfoxide and discarding the remaining portion of the distilland.

7. The process of treating dimethyl sulfoxide to remove impurities, particularly those causing relatively high light absorbance at 270–300 mu, which comprises contacting dimethyl sulfoxide with between 1% and 10% of its weight of an acid-washed activated charcoal at least once for from 15 to 40 minutes, separating the dimethyl sulfoxide from the charcoal, rectifying the dimethyl sulfoxide under a pressure maintained below 25 mm. Hg, separating and discarding a forerun of impure distillate, collecting the distillate having a low 270–300 mu light absorbance as purified dimethyl sulfoxide and discarding the remaining portion of the distilland.

8. The process of claim 7 and including the additional steps of relieving the partial vacuum over said collected distillate and saturating the distillate with nitrogen gas by intimately contacting the distillate with nitrogen gas after the partial vacuum has been relieved.

9. The process of claim 8 and including the additional steps of introducing a small amount of nitrogen gas into the distilland during rectification, relieving the partial vacuum over the distillate with nitrogen gas and storing the distillate under nitrogen gas.

10. The process of treating a dialkyl sulfoxide containing up to 6 carbon atoms to remove impurities, particularly those causing relatively high light absorbance at 270–300 mu, which comprises contacting the dialkyl sulfoxide with an acid-treated adsorptive carbon, contacting the dialkyl sulfoxide with a basic compound to react with the acid imparted to the dimethyl sulfoxide by the carbon, rectifying the dialkyl sulfoxide and collecting the distillate having low 270–300 mu light absorbance.

11. The process of treating dimethyl sulfoxide to remove impurities, particularly those causing relatively high light absorbance at 270–300 mu, which comprises contacting dimethyl sulfoxide at least once with between 1 percent and 10 percent of its weight of an acid-treated adsorptive carbon for at least 15 minutes, contacting the dimethyl sulfoxide with at least 0.25 percent of its weight of a compound selected from the group consisting of alkali metal hydroxides, alkali metal carbonates, alkaline-earth metal oxides, alkaline-earth metal hydroxides and alkaline-earth metal carbonates to react with the acid imparted to the dimethyl sulfoxide by the carbon, rectifying the dimethyl sulfoxide while maintaining the pressure below 80 mm. Hg and collecting as purified dimethyl sulfoxide the distillate having low 270–300 mu light absorbance.

12. The process of claim 11 and wherein said compound is magnesium oxide and wherein said compound and its reaction products with the acid are removed by filtration from the dimethyl sulfoxide prior to rectification.

13. A process as in claim 9 and wherein the temperature of the dimethyl sulfoxide during the charcoal contact is in the range of about 20° C. to 40° C.

References Cited

UNITED STATES PATENTS

| 2,539,871 | 1/1951 | Smedslund | 252—1 |
|---|---|---|---|
| 2,581,050 | 1/1952 | Smedslund | 260—607 |
| 2,624,699 | 1/1953 | Joris | 203—37 |
| 2,768,942 | 10/1956 | Marple et al. | 203—41 |
| 2,935,533 | 5/1960 | Hubenet | 260—607 |

FOREIGN PATENTS 154,265  9/1963  U.S.S.R.

WILBUR L. BASCOMB, JR., *Primary Examiner.*